United States Patent
Voloschenko et al.

(10) Patent No.: US 10,788,610 B2
(45) Date of Patent: *Sep. 29, 2020

(54) METHOD FOR DESIGN AND MANUFACTURING OF OPTICS FOR HOLOGRAPHIC SIGHT

(71) Applicant: LUMINIT LLC, Torrance, CA (US)

(72) Inventors: Dmitry Voloschenko, Torrance, CA (US); Engin B. Arik, Moorpark, CA (US); Fedor Dimov, Redondo Beach, CA (US); Kevin Yu, Temple City, CA (US); Khin Swe Yin, Alhambra, CA (US); Neven Rakuljic, Santa Ana, CA (US)

(73) Assignee: Luminit LLC, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/568,764

(22) Filed: Sep. 12, 2019

(65) Prior Publication Data

US 2020/0018883 A1    Jan. 16, 2020

Related U.S. Application Data

(63) Continuation of application No. 16/103,524, filed on Aug. 14, 2018, now Pat. No. 10,451,786, which is a continuation of application No. 13/923,685, filed on Jun. 21, 2013, now Pat. No. 10,061,069.

(60) Provisional application No. 61/663,314, filed on Jun. 22, 2012.

(51) Int. Cl.
| | | |
|---|---|---|
| G02B 5/32 | (2006.01) | |
| G03H 1/04 | (2006.01) | |
| G02B 23/26 | (2006.01) | |
| G02B 23/24 | (2006.01) | |
| G02B 27/01 | (2006.01) | |
| F41G 1/30 | (2006.01) | |
| G03H 1/22 | (2006.01) | |
| G03H 1/26 | (2006.01) | |

(52) U.S. Cl.
CPC ............... *G02B 5/32* (2013.01); *F41G 1/30* (2013.01); *G02B 23/2407* (2013.01); *G02B 23/26* (2013.01); *G02B 27/0103* (2013.01); *G02B 27/0189* (2013.01); *G03H 1/0486* (2013.01); *G03H 2001/0439* (2013.01); *G03H 2001/2226* (2013.01); *G03H 2001/261* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,824,193 A | * | 4/1989 | Maeda .................... | G02B 5/32 359/15 |
| 4,948,213 A | * | 8/1990 | Hasegawa ............ | G02B 26/106 359/18 |
| 5,361,149 A | * | 11/1994 | Hasegawa ................ | G02B 5/32 359/15 |

(Continued)

*Primary Examiner* — Jennifer D. Carruth
(74) *Attorney, Agent, or Firm* — Lathrop GPM LLP

(57) ABSTRACT

A method for design and fabrication of holographic optical elements for a compact holographic sight is proposed. The method includes use of ray-trace software to design holographic elements having optical power using an intermediate hologram with parameters obtained through minimization of the merit function defining image quality.

34 Claims, 6 Drawing Sheets

(56) References Cited

U.S. PATENT DOCUMENTS 10,061,069 B2 * 8/2018 Voloschenko ........... G02B 5/32
10,451,786 B2 * 10/2019 Voloschenko ......... G02B 23/26

* cited by examiner

METHOD FOR DESIGN AND MANUFACTURING OF OPTICS FOR HOLOGRAPHIC SIGHT

CROSS-REFERENCE TO RELATED APPLICATIONS

This application is a continuation of U.S. patent application Ser. No. 16/103,524, filed on Aug. 14, 2018, which is a continuation of U.S. patent application Ser. No. 13/923,685, now U.S. Pat. No. 10,061,069, filed Jun. 21, 2013, which claims the priority benefit of U.S. Provisional Patent Application Ser. No. 61/663,314, filed Jun. 22, 2012, all of which are incorporated herein by reference in their entireties.

BACKGROUND OF THE INVENTION

See-through optical sights for simulation, training, and close combat (distances less than ~1000 m) based on collimated optics have been in use for years.[1—Elementary optics and applications to fire control instruments: May, 1921 By United States. Army. Ordnance Dept, page 84, 2—R. P. Grauslys, A. R. Harding, 'Weapon Aiming Device', U.S. Pat. No. 7,530,192 B2 (2009)]. The advantage of collimated optics based sights is in the reticle image appearing in the same plane or close to the target plane. This makes the targeting more precise and comfortable. Usually, a see-through monocular optical sight consists of a reticle illuminated with some small light source, reflective and/or refractive optics to create a magnified virtual image of the reticle for a viewer's eye. The simplest type of reticle is a "red dot"—just an LED or laser diode as a reticle. The disadvantage of regular see-through sight optics is in low light throughput due to the unavoidable losses of semitransparent optics for both see-through and reticle image. Implementing narrowband reflecting dichroic mirrors mitigates this problem, but requires narrow bandwidth laser diodes. Implementing laser diodes in sights is questionable as accumulated exposure to bright laser light/scatter in the visible spectrum range can bring to damage of the shooter's eye. Speckled reticle image is also an issue.

Holographic optics based sights implementing high efficient (>90%) thick holograms have higher light throughput [3—R. Bhatt, 'Testing of Holographic Optical Elements for Holographic Gun-Sight', Optics and Lasers in Engineering, Vol. 46, pp. 217-221 (2008), 4—W. R. Houde-Walter, 'Head up Display for Firearms", U.S. Pat. No. 7,721,481 B2 (2010)]. The deficiency of existent holographic sights is in implementing laser diodes to avoid dispersion and in rather complicated multi-element optics needed to compensate aberrations [5—A. M. Tai, E. Sieczka, 'Lightweight Holographic Sight', U.S. Pat. No. 6,490,060 B1 (2002), Assignee EOTech Inc.]. This sight optics, with the reticle image recorded in the hologram, requires individual time consuming alignment of each element, and applied laser diode creates the coherent reticle image with significant speckle that is negatively affecting the image perception.

An edge-illuminated substrate holographic approach with a single hologram for see-through reticle image creation was proposed [6—J. Upatnieks, 'Compact Holographic Sight', Proc. SPIE, Vol. 883, pp. 171-176 (1988)]. Such approach indeed allowed for a see-through imagery with simultaneous view of the outside world, however the image quality was rather poor for a broad-band light source, mostly because of the color dispersion created by a single hologram for a broad-band source; for a laser-based (narrow-band) source, an unwanted shift in virtual image position was observed with a drift in laser diode wavelength due to, e.g., external temperature changes. A single-hologram approach was followed by some developers [7—Simmonds, 8—Takeyama, 9—Kasai] for compact see-through head (helmet)-mounted displays (HMDs) using either a single laser source for object illumination or proposing very complicated hologram recording geometries for generating aspheric recording wave-fronts which are rather complicated and costly to be implemented in practice. While providing substantially much more field-of-view that is actually required, e.g., for a see-through weapon sight, it is understood in the art that these developed designs, with a reduced field-of-view and an extended eye-relief, can be used as see-through sights with an illuminated (or, holographically-recorded) reticle replacing a micro-display required as image source for HMDs.

Another approach uses diffractive elements placed on a transparent waveguide to create an enlarged see-through virtual image for a viewer [10—P. Repetto, E. Borello, S. Bernard, 'Light Guide for Display Devices of the Head-Mounted or Head-up Type', U.S. Pat. No. 6,825,987 B2 (2004), 11—T. Levola, Method and Optical System for Coupling Light Into a Waveguide, U.S. Pat. No. 7,181,108 B2 (2007)]. While providing a see-through capability, such approach suffers from stray light generated by unwanted diffraction into undesired diffractive orders that substantially decreases the image quality and contrast.

Another approach uses partially reflective elements placed at some angle on a transparent waveguide [12—Ya. Amitai, 'Substrate-Guided Optical Beam Expander', U.S. Pat. No. 6,829,095 B2 (2004)]. While creating a see-through imagery, fabrication of such elements in mass quantities can be prohibitively expensive, and providing a needed long eye-relief (~100 mm) is not possible.

In an attempt to remove the color dispersion/shift of the imagery, another approach was introduced that uses two substrate-guided coupled holograms for a see-through image creation [13—Ya. Amitai, A. Friesem, I. Shariv, 'Planar Holographic Optical Device for Beam Expansion and Display', U.S. Pat. No. 6,169,613 B1 (2001), 14—F. Dimov et al., 'Holographic Substrate-Guided Wave-Based See-Through Display', US 2010/0157400 A1 (2010), 15—H. Mukawa, 'Optical Device and Virtual Image Display', U.S. Pat. No. 7,453,612 (2008), 16—H. Mukawa, K. Akutsu, 'Optical Device and Virtual Image Display Device', U.S. Pat. No. 7,418,170 (2008), 17—Y-R. Song, 'Wearable Display System Adjusting Magnification of an Image', US Pat. Application US2004/0004767 A1 (2004)]. The two holograms are coupled through a common substrate due to TIR. The chromatic dispersion of the first hologram is corrected by the dispersion of the second one, and the design is insensitive to light source wavelength drift/shift. While providing a means to mostly remove the color dispersion/shift from the imagery for the case when two identical holographic gratings are placed mirror-symmetrically on the waveguide, the developed systems require incorporation of additional optics that adds up to weight, volume, and cost. A desired reduction of the number of optical elements for such see-through systems was not clarified, except for [13—Ya. Amitai, A. Friesem, I. Shariv, 'Planar Holographic Optical Device for Beam Expansion and Display', U.S. Pat. No. 6,169,613 B1 (2001)], where a compact sight was proposed that incorporates a holographic lens coupled to a holographic grating through the total internal reflection (TIR) in the substrate. While indeed showing a good image quality for up to 4.0 mm diameter Eye Box size, the demonstrated Eye Box size is not large enough to provide an adequate see-through sight.

In the last ten years, software-based ray-trace techniques of designing holographic elements substantially advanced compared to traditional multi-step recursive analytical techniques described in, e.g. [13—Ya. Amitai, A. Friesem, I. Shariv, 'Planar Holographic Optical Device for Beam Expansion and Display', U.S. Pat. No. 6,169,613 B1 (2001)]. Using commercial off-the-shelf software such as, e.g., Zemax® or Code V®, it is quite possible to implement, in a robust and re-producible way, rather sophisticated holographic designs, thus revealing essentially new features in multi-component holographic systems. An additional advantage of such an approach compared to a traditional analytical recursive one is that it is rather straightforward to transfer a software-made design on an optical table and, actually, implement recording in practice.

What is desired is a method to design and fabricate substrate-guided holographic optical elements for a compact see-through weapon sight, which is reliable, reproducible, capable of providing large enough aperture sizes (e.g., up to 1.5 inch diameter), and extendable for low-cost mass production. In such a sight, in a compact form-factor, there is a thin transparent waveguide with holographic elements enabling in-coupling and out-coupling of light to/from the waveguide in such a way as to create a sufficient field-of-view, aberration-free virtual image of the reticle superimposed on the scene view, with a capability to provide a long (up to 100-200 mm) eye relief, and to provide a highly-transparent (~90%) view of the outside world, with parallax reduced to unnoticeable, for a shooter level. At the same time, a monocular sight provides a see-through imagery without introduction of any noticeable color shifts/changes and laser speckle in the field-of-view and should be safe for a shooter's eye, and therefore avoid using laser illumination. The compact optical sight described above is the concept described in [13—Ya. Amitai, A. Friesem, I. Shariv, 'Planar Holographic Optical Device for Beam Expansion and Display', U.S. Pat. No. 6,169,613 B1 (2001)]. As was shown in [14—F. Dimov et al., 'Holographic Substrate-Guided Wave-Based See-Through Display', US 2010/0157400 A1 (2010)], such a system can be made of substantial aperture sizes (e.g., ~1.5 inch diameter). It requires a broadband illumination source, provides a see-through imagery without color shift.

SUMMARY OF THE INVENTION

A substrate-guided holographic sight as an efficient weapon aiming solution for close combat (up to 1000 m), such as for a projectile weapon, comprises the subject invention. It is based on advanced holographic techniques, and has a single-component optical element comprising a light-guide plate, two coupled holographic optical elements paired with a thin transparent plate with a reticle, and a miniature LED module with a diffuser for reticle illumination. Divergent light from the LED module illuminates the reticle on the transparent plate. The image of the reticle is formed by a substrate-guided holographic lens coupled to a substrate-guided holographic grating through TIR in the substrate-guided holographic sight substrate. Diffusive illumination supports uniform image brightness across the entire 1.5 inches eyebox. A shooter aims a weapon through the transparent holographic grating part of the substrate-guided holographic sight.

Another aspect of the disclosure provides a method of design and recording holographic optical elements for substrate-guided holographic sight using an intermediate hologram and a ray-tracing technique that includes optimization of image quality using a damped-least square optimization procedure for the merit function minimization.

The benefits and advantages of the disclosure will be apparent to those skilled in the art from the discussion that follows.

DETAILED DESCRIPTION OF THE PREFERRED EMBODIMENTS

Figure 1:
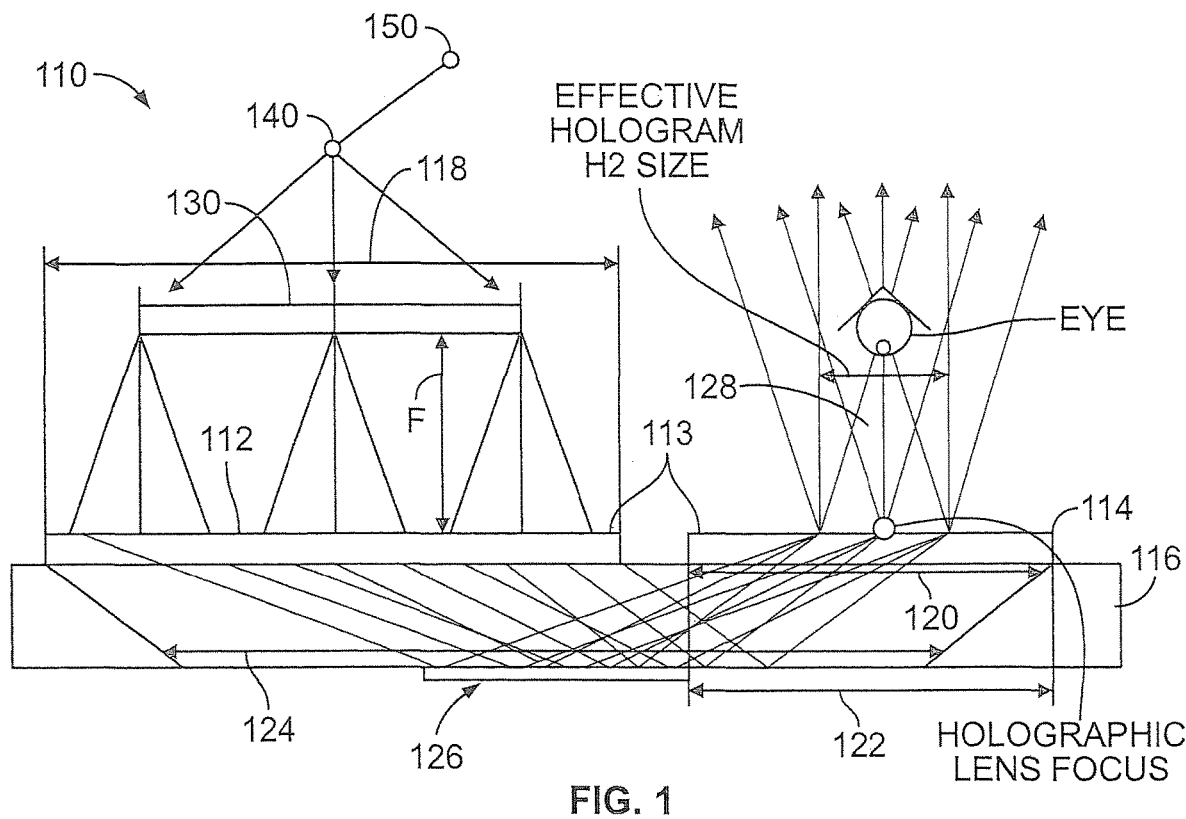
FIG. 1 is a diagram of optical portions of one operative substrate-guided holographic sight.

In the following, unless otherwise stated, the term recorded or recording refers to the fabrication of a holographic element.

Although the present invention is susceptible of embodiment in various forms, there is shown in the drawings and will hereinafter be described presently preferred embodiments with the understanding that the present disclosure is to be considered as an exemplification of the invention and is not intended to limit the invention to specific embodiments illustrated.

It is to be further understood that the title of this section of the specification, namely, "Detailed Description of the Preferred Embodiments" relates to a rule of the United States Patent and Trademark Office, and is not intended to, does not imply, nor should be inferred to, limit the subject matter disclosed herein or the scope of the invention.

The method of the subject invention comprises a design for the optics of a see-through holographic weapon sight, with the optical parameters comparable to optical sight based on common optics, with performance in terms of brightness (luminance), contrast, absence of speckle and scattered light that degrades the reticle image, absence of parallax, the number of components used, weight, and cost in a manner that exceeds present optical sights that are based on optics common in the art.

Referring to FIG. 1, a substrate-guided holographic sight 110 of the subject invention has a first hologram 112 and a second hologram 114 either laminated directly to a substrate 116 or, alternatively, laminated onto thin (~1 mm) substrates 113 that are attached to the substrate 116. The substrates 113 and 116 are substantially transparent in at least a portion thereof, but may be also entirely transparent in the visible spectrum range (400 nm-700 nm). The substrate 116, or plate, can be made from a number of materials. For example, the transparent portions of the plate 116 can be made of glass, polycarbonate plastic or acrylic plastic. Such a plate 116 is at least operative when having a thickness of the 3-6 mm, but can also be operative at other thicknesses. The external surface of the plate 116 should have a first transparent region 118 (from the reticle side only, the other side can be opaque in the first region) for accepting a transmitted image of the reticle, a second transparent region 120 for transmitting the accepted image, and a third viewing region 122 that permits viewing through the entire plate, and a transparent volume 124 throughout the substrate along with the entire path from where the transmitted image is accepted to where the accepted image is transmitted. All of the transparent regions may overlap with each other, and the substrate is not restricted from having transparent regions or volumes that are larger than mentioned. Substrates 113 can be made from, e.g., optical quality soda-lime glass such as the glass used for manufacturing liquid crystal displays and supplied, e.g., by Corning, and attached to the substrate 116 using a UV-curable optical glue manufactured, e.g., by Norland Products. Alternatively, they can be made of optical quality plastic material known in the art.

The substrate 116 is depicted in the figures as a single, unitary body of a single material. However, the substrate 116 may also comprise a plurality of bodies made of a single or a plurality of materials. A person of ordinary skill in the art will be capable of using ray-tracing software to determine whether the particular configuration of materials and bodies will serve to transmit the accepted image to where it can be transmitted to a viewer.

The substrate 116 as depicted is an uncoated unitary body. As such, the accepted image is conveyed to the region 120 where the image is transmitted out of the substrate 116. This conveyance may be done directly, without internal reflections by the accepted image being conveyed to the transmission area in a straight line. This conveyance may also be done by internal reflections. One way to achieve internal reflection is to coat the substrate at the locations where reflection is required with a reflective material, many of which are known to those of ordinary skill in the art. An evaporated layer of silver is an example of a coating 126, although the reflective layer may be applied by any means and may be of any composition that is functional.

Another way to achieve internal reflection is by total internal reflection (TIR). In this case, the substrate must either have an index of refraction, relative to the environmental medium, sufficient to internally reflect the light of the accepted image. Total internal reflection is especially preferred for reflections that occur near the portion of the substrate 116 where the accepted image is transmitted out of the substrate 116. For example, for an air-acrylic interface, $\alpha^{TIR}=\sin^{-1}(1/1.49)=42.2°$.

Transparent means that the substrate 116 is capable of permitting light through to allow a shooter to receive and interpret the image of the reticle and to see the target. Accordingly, the substrate 116 may be tinted or have other modifications that do not render the device inoperative. For example, any material will have some amount of diffusion from imperfections or inclusions, but the diffusion should not be so great as to prevent the acceptance, conveyance, and transmission of the image by the substrate 116.

Referring further to FIG. 1, the first transparent region 118 (accepting a transmitted image) faces first hologram H1 112; the second transparent region 120 (transmitting the accepted image) faces second hologram H2 114; the third transparent region is at least as large as the field of view 128 and includes the surfaces on both sides of the substrate and the volume in between.

The first and second holograms 112 and 114 can be placed either on the same side of the substrate, or on opposite sides. Holograms H1 and H2 in fact are holographic optical elements (HOE), either or both of them can have optical power. The preferred embodiment has at least one with optical power.

In one embodiment, first hologram H1 112 has optical power. As such, first hologram H1 112 is a holographic lens. In that embodiment, second hologram H2 is a holographic grating 112 with no optical power.

A distinctive feature of these holograms is their capability to couple the light in the substrate at angles larger than or equal to total internal reflection (TIR) angle of the substrate, and to out-couple the light that propagates along the substrate.

Another distinctive feature of these holograms 112, 114 is that they are Bragg holograms. This means that they diffract the light in single diffraction order. Hence their diffraction efficiency can be very high (theoretically 100%). This results in very high light throughput of the optical system. Contrary to this, other see-through sights are based on beam combiners (semitransparent or dichroic mirrors) and have much smaller light throughput.

Another distinctive feature of holograms 112, 114 is that they are recorded with lasers of, e.g., three different colors (e.g., Blue at 457 nm, Green at 532 nm and Red at 647 nm), thus providing a means of generating an image of the reticle in either color, depending on shooter's preference and the color and tint of the background scene.

The substrate-guided holographic see-through sight 110 operates by using substrate-guided wave (SGW) holograms. Some basic information about SGW holograms and theory developed is presented in H. Qiang and J. A. Gilbert, "Diffraction Properties of Substrate Guided Wave Holograms", Optical Engineering, col. 34, no. 10, p. 2891, 1995, also on Kogelnik's coupled wave theory. H. Kogelnik, "Coupled Wave Theory for Thick Hologram Gratings", The Bell System Technical Journal, vol. 48, no. 9, 1969.

Figure 3:
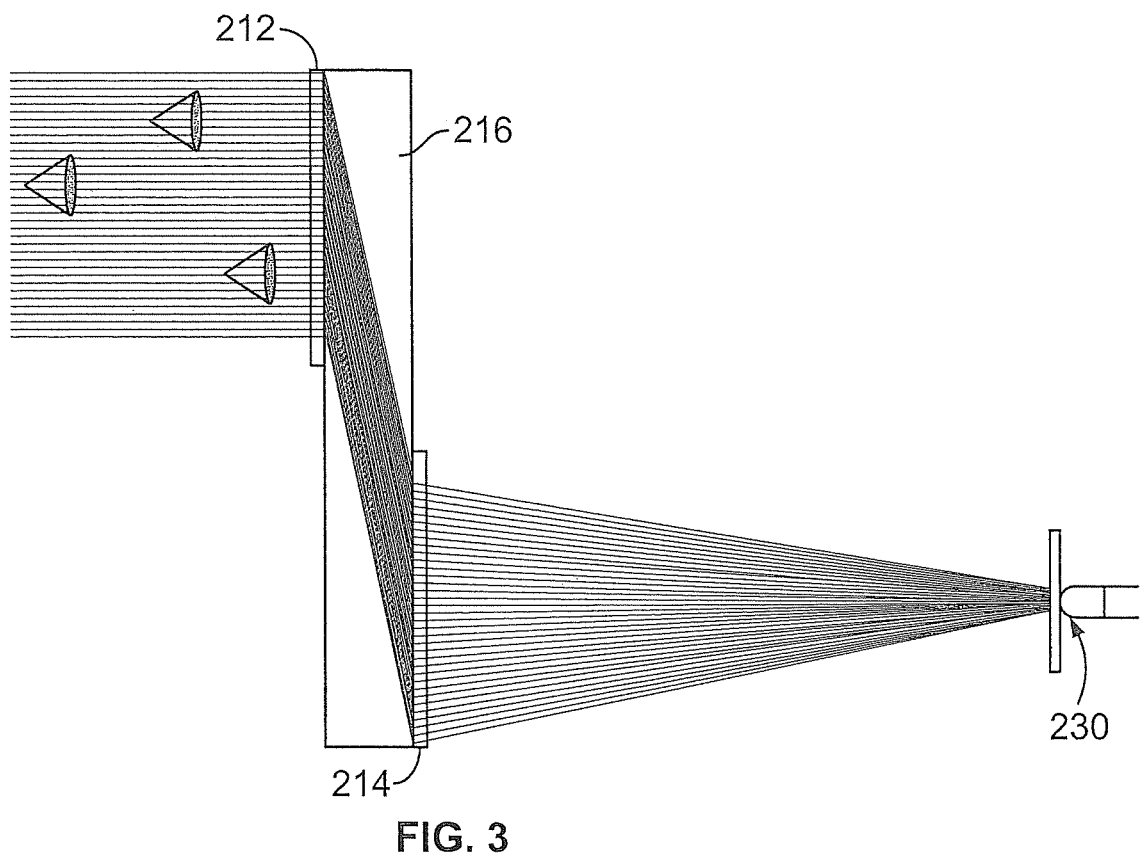
FIG. 3 is a ray-trace design of a holographic sight using transmissive-type holographic elements.
Figure 4:
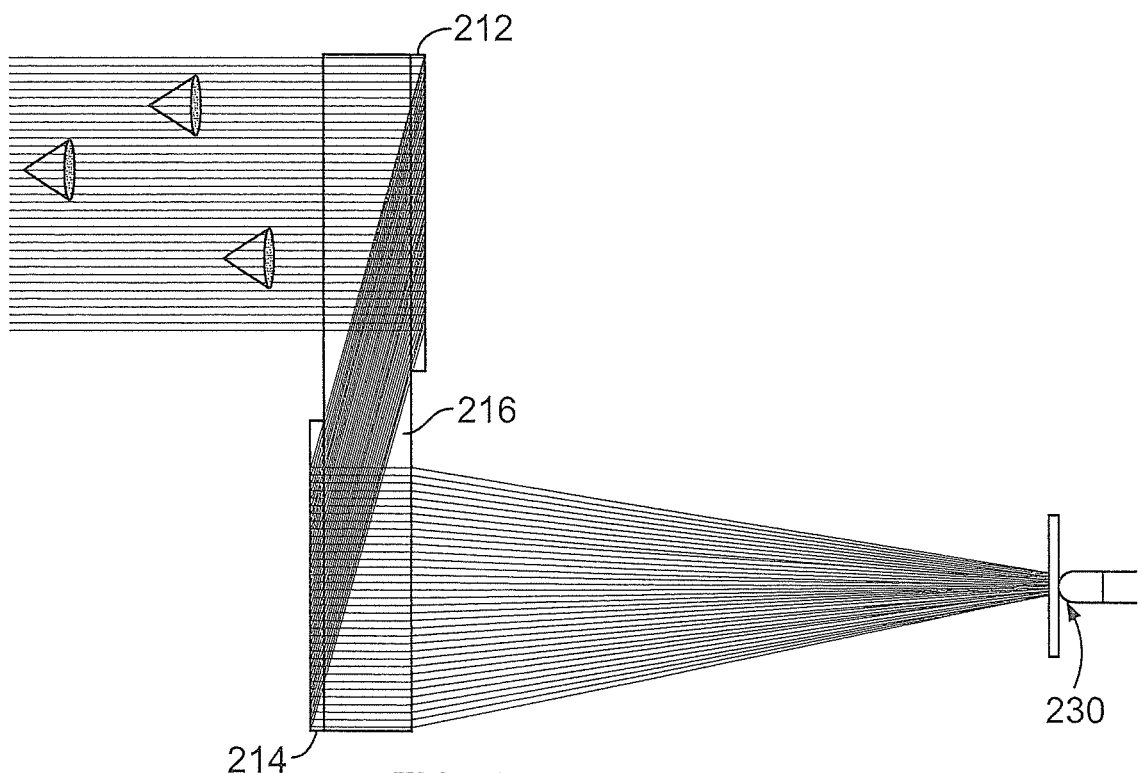
FIG. 4 is a ray-trace design of a holographic sight using reflective type holographic elements.

Holographic elements 112 and 114 can be either reflective or transmissive, as shown in FIGS. 3 and 4, or a combination of reflective and transmissive type. The type of the holographic element (reflective or transmissive) is defined by a corresponding experimental/manufacturing recording geometry known to those skilled in the art. These geometries yield better adjustments to the specific weapon, more convenient eye position and higher resolution and wavelength selectivity for a reflection hologram.

The transparent plate 130 with the reticle implemented on it is illuminated by the LED module 140 placed in the vicinity of the plate 130. The LED module 140 comprises, at least, one low power LED (~20 mA driving current value) and can have a light conditioning optic. The LED light can be either Blue, Green or Red, or of any other suitable color comprising three LEDs that is appropriate for target aiming. For LEDs of different colors (e.g., Blue, Red and Green), a switch 150 is incorporated on the LED module that allows a shooter to switch between three colors depending on the background scene. E.g., for brown-red backgrounds (desert type scenery) Green illumination can be chosen. For green backgrounds (grass, trees), Red illumination can be chosen, etc. Thus, substrate-guided holographic sight provides a better, improved visibility of the aiming reticle on various backgrounds as compared to the systems known in the prior art. Preferably, an LED(s) with narrow-band emission is used, ~20-25 nm FWHM.

If more than one LED is used, multiplexed holograms are used as known by those skilled in the art. Holograms are recorded with a larger angle between recording beams (preferably reflection holograms) to avoid crosstalk between reticle images retrieved with different holograms. The condition of avoiding crosstalk is to satisfy the difference in angles of beams diffracted on wrong holograms so they do not intersect in the image area, as known by those skilled in the hologram multiplexing art.

Figure 2:
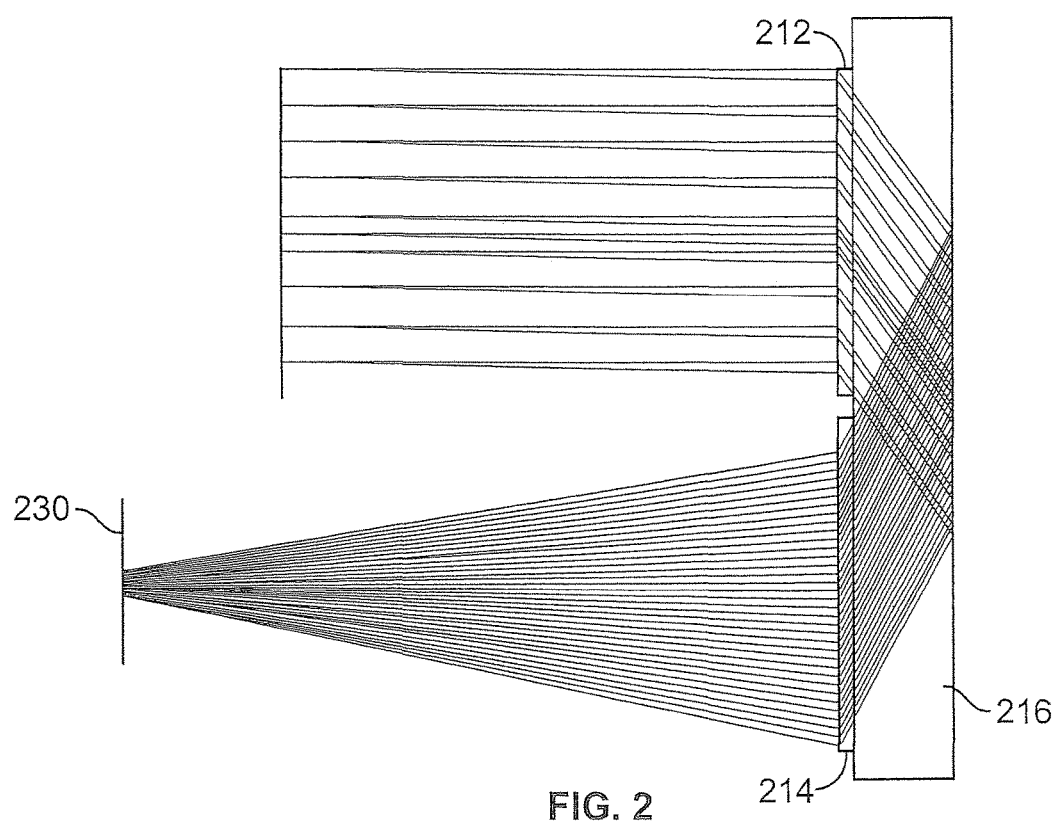
FIG. 2 is a ray-trace design of substrate-guided holographic sight, holographic lens 214 is recorded using a collimated wavefront and a divergent spherical wavefront, wavelengths: 0.532 µm, 0.525 µm, 0.510 µm.

FIG. 2 shows an example of the actual ray-trace for substrate-guided holographic sight. The rays are traced from the position of the shooter's eye towards the reticle, field-of-view ~1.2 deg. The reticle can be placed on either side of the substrate-guided holographic sight substrate. For instance, on FIG. 2 it is placed on the same side as the viewing holographic element. For achieving a more compact packaging, it can be placed on the side of the substrate which is opposite to the one where a viewing holographic element is placed.

A flat fold mirror can be placed in between the reticle 230 and holographic lens 214 to provide a better over-all compactness of the weapon sight.

Figure 5:
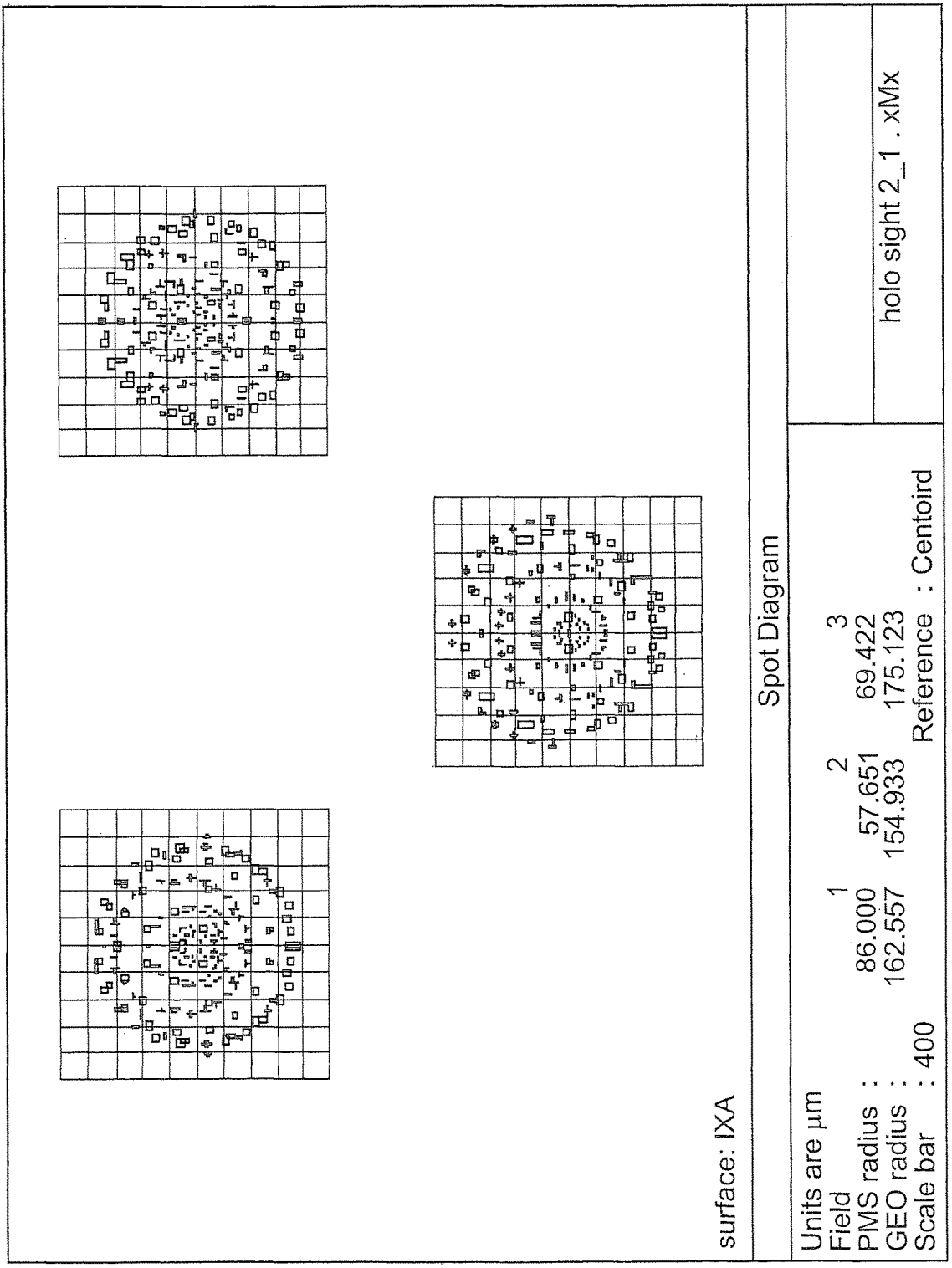
FIG. 5 is a spot diagram showing image quality for the ray-trace design of FIG. 2, fields-of-view are: 0 deg, −0.6 deg, +0.6 deg, wavelengths: 0.532 µm, 0.525 µm, 0.510 µm.

FIG. 5 shows the image quality (geometrical spot size) for the ray-trace of FIG. 5. A rather substantial amount of spherical aberration is visible on the spot diagram. For the design shown on FIG. 2, the holographic lens 214 is recorded with ray-tracing software using a divergent spherical wavefront and a collimated wavefront. These wavefronts are not shown on FIG. 2, instead, a resultant ray-trace through existing HOEs is shown.

To improve the image quality, a method is developed that comprises recording an intermediate holographic element in a ray-trace software (e.g., in Zemax® or in Code V®), so that a final holographic lens 214 is recorded by a collimated wavefront and a wavefront generated by the intermediate holographic element. Such procedure offers such advantages as it is more robust (always converges to a solution) and more flexible (i.e., applicable to a variety of holographic element design tasks) compared to a traditional analytical recursive technique proposed, e.g., in [13—Ya. Amitai, A. Friesem, I. Shariv, 'Planar Holographic Optical Device for Beam Expansion and Display', U.S. Pat. No. 6,169,613 B1 (2001)].

Figure 6:
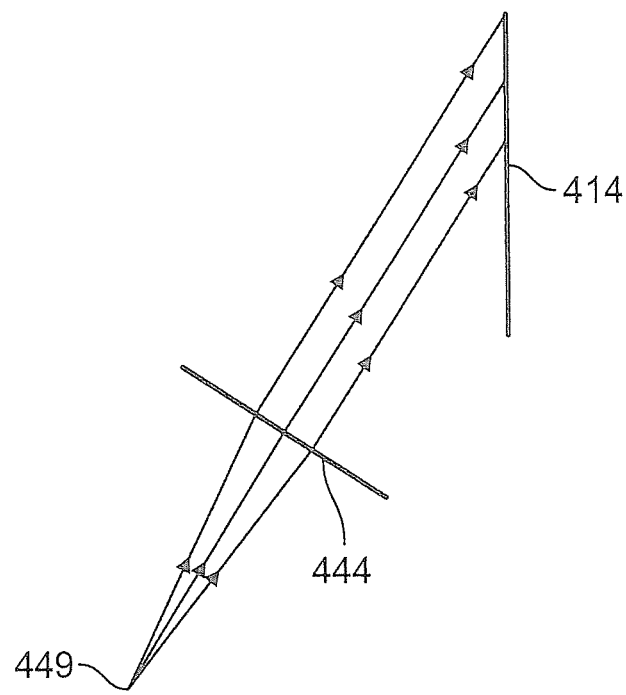
FIG. 6 is a collimated wavefront used in recording holographic lens 214.
Figure 7:
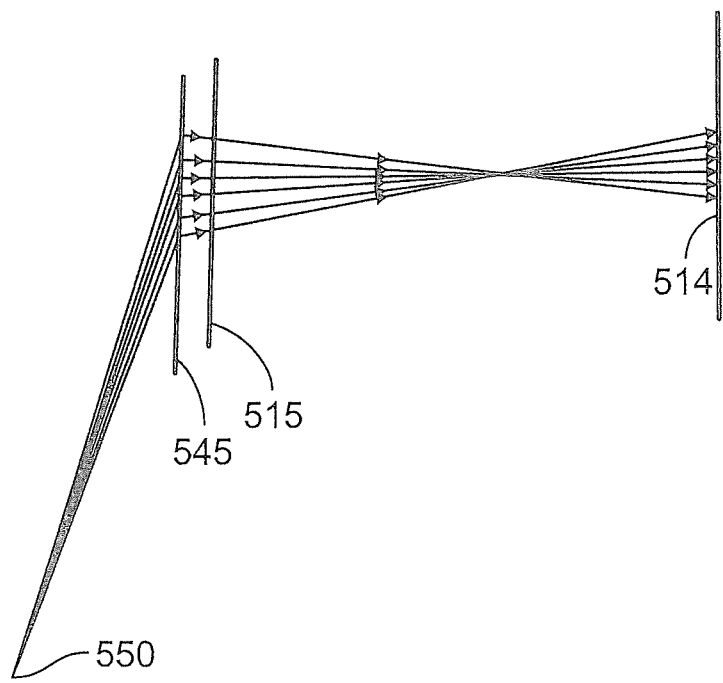
FIG. 7 is a ray-trace for recording holographic lens 214 using an intermediate hologram.
Figure 8:
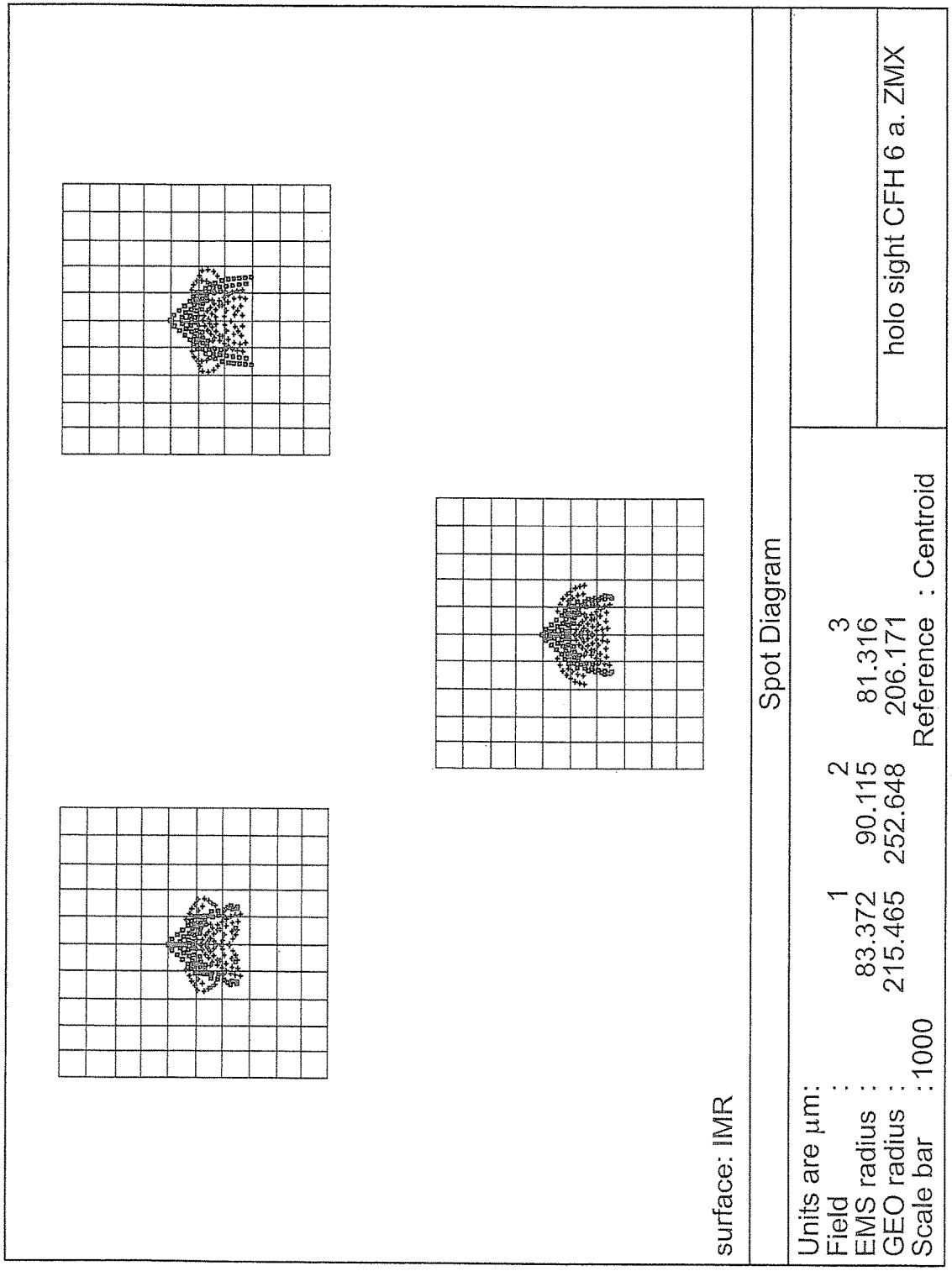
FIG. 8 is a spot diagram showing image quality for the ray-trace design of FIGS. 4 and 5, fields-of-view are: 0 deg, −0.6 deg, +0.6 deg, wavelengths: 0.532 µm, 0.525 µm, 0.510 µm.

FIGS. 6 and 7 show wavefronts that are used for recording with ray-trace software the HOE 214: FIG. 6—a collimated wavefront and FIG. 5—a wavefront generated by an intermediate hologram 515. Coordinates of the two points that are used in recording hologram 515 with ray-trace software are variables for the merit function that also includes surface tilts and decenters as variables as well. Point 449 is a point source, surface 444 represents a paraxial surface that can be implemented in practice, e.g., using a high-quality achromatic doublet of the same focal length as the paraxial lens manufactured, e.g., by JML Optical; element 414 is a plane for recording of the hologram 214. Intermediate hologram 515 is recorded with ray-trace software using a point source 550 and a point at infinity (not shown); 'paraxial' lens 545 represents, e.g., a high-quality achromatic doublet which is of the same focal length as the 'paraxial' lens. FIG. 8 shows spot diagram for substrate-guided holographic sight that includes hologram 214 recorded using the described method.

Figure 9:
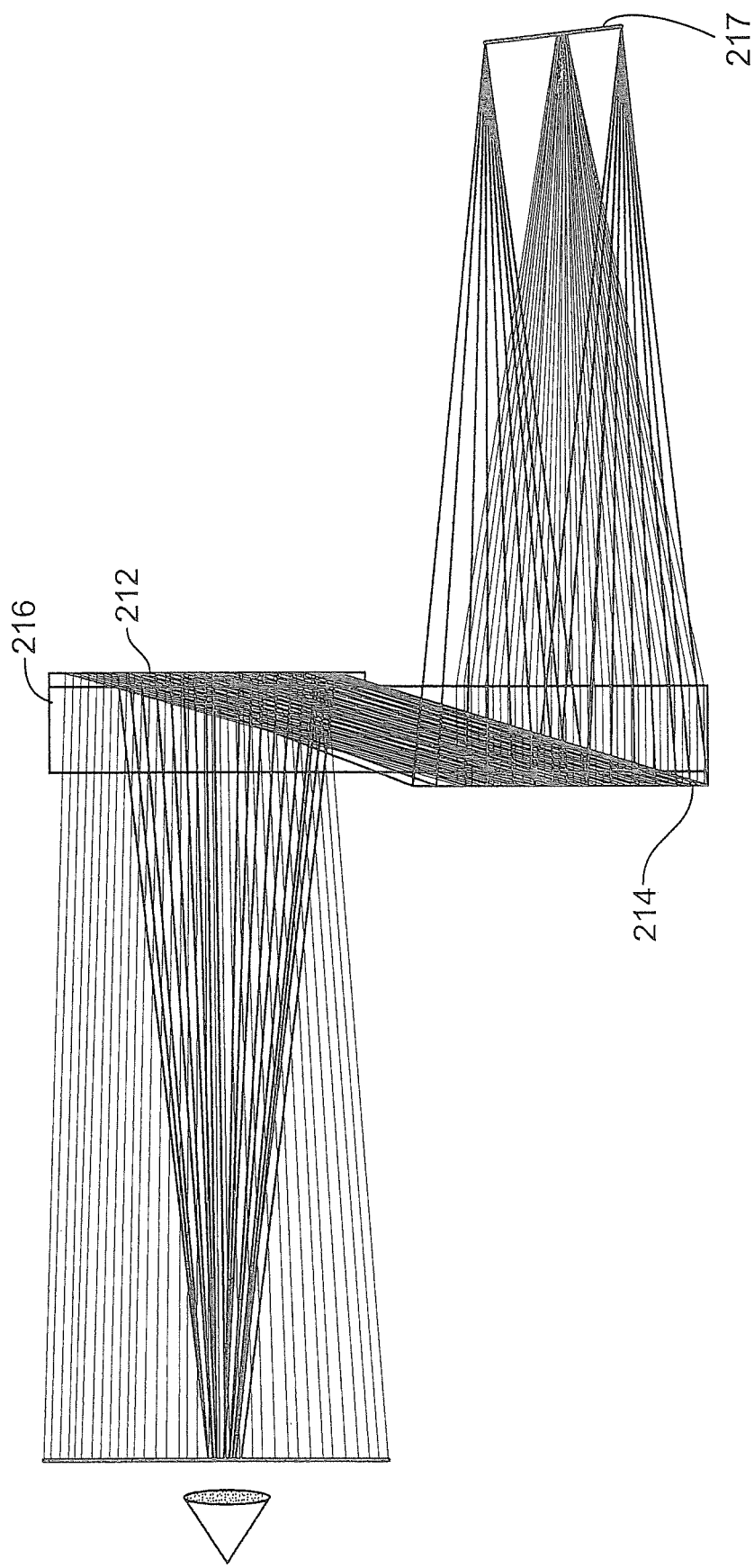
FIG. 9 is a ray-trace design showing use of a micro display.

A sight with a single reticle can further be improved with a dynamic overlay image by replacing the reticle with a micro display 217, as shown in FIG. 9.

The described embodiments of the method for design and fabrication of the holographic optics for the weapon sight refer to methods and techniques to make 'master' holograms. The 'master' holograms need to be replicated. This can be done, e.g., using contact copying of volume ('thick') holographic optical elements by means of a single laser beam illumination, known by those skilled in the art, with roll-to-roll web process. A flexible film such as static cling vinyl as an index matching material can be used. The advantage of this material is that it will suppress the recording of spurious holograms and will allow dry contact copying.

Another important factor in copying is that the photopolymer material requires an absorption liner such as black polyester or orange dyed polyester (available, e.g., from CPFilms) as a top liner to avoid recording spurious holograms.

The foregoing it will be observed that numerous modifications and variations can be effectuated without departing from the true spirit and scope of the novel concepts of the present inventions. It is to be understood that no limitation with respect to the specific embodiment illustrated or should be inferred. The disclosure is intended to cover by the appended claims all such modifications as fall within the scope of the claims. All of the references that follow are incorporated by reference as if set forth fully herein.

The invention claimed is:

1. An optical device comprising a light guide plate, two holograms secured to the light guide plate, a reticle or microdisplay placed on the light guide plate, a damped least square optimized intermediate holographic element, and at least one LED module in the vicinity of the light guide plate.

2. The optical device of claim 1 further comprising a diffuser.

3. The optical device of claim 1 wherein the light guide plate comprises glass, polycarbonate, acrylic, or mixtures thereof.

4. The optical device of claim 1 wherein the light guide plate comprises a thickness in the range of 3 to 6 mm.

5. The optical device of claim 1 wherein the light guide plate comprises a unitary body or a body comprised of a plurality of bodies.

6. The optical device of claim 1 wherein the light guide plate comprises a single material or a plurality of materials.

7. The optical device of claim 1 wherein the light guide plate comprises a reflective coating on at least one surface.

8. The optical device of claim 7 wherein the coating comprises silver metal.

9. The optical device of claim 1 wherein the light guide plate comprises a tint.

10. The optical device of claim 1 wherein the light guide plate comprises the two holograms on a same surface of the light guide plate or an opposite surface of the light guide plate.

11. The optical device of claim 1 wherein at least one of the holograms comprises a holographic element having optical power.

12. The optical device of claim 1 wherein one of the holograms comprises a holographic lens and the second of the holograms comprises a holographic grating.

13. The optical device of claim 1 wherein the two holograms comprise Bragg holograms.

14. The optical device of claim 1 wherein the two holograms are recorded with lasers of at least three different colors.

15. The optical device of claim 1 wherein the holograms are either reflective or transmissive or a combination thereof.

16. The optical device of claim 1 wherein the at least one LED comprises three LEDs comprising Blue, Green, and Red lighting.

17. The optical device of claim 1 comprising more than one LED and a multiplexed hologram.

18. The optical device of claim 1 further comprising a mirror.

19. The optical device of claim 1 wherein the reticle comprises an image of one color or multiple images of one or multiple colors displayed simultaneously.

20. The optical device of claim 1 wherein at least one hologram is recorded using a divergent spherical wavefront and a collimated wavefront or a collimated wavefront and a wavefront generated by the damped least square optimized intermediate holographic element.

21. The optical device of claim 1 comprising an optical sight, a holographic sight, or a weapon sight.

22. The optical device of claim 1 wherein at least one of the holograms is laminated onto a thin substrate that is attached to the light guide plate.

23. The optical device of claim 1 wherein the thin substrate and the light guide plate are substantially transparent.

24. The optical device of claim 1 wherein the light guide plate comprises a first transparent region spanning the surface of one of the holograms; a second transparent region spanning a surface of the other hologram; a third transparent region spanning a surface opposite to that of the second transparent region corresponding to a field of view; and a transparent volume throughout the light guide plate wherein other surfaces are opaque.

25. The optical device of claim 1 wherein the reticle or microdisplay is placed on either side of the light guide plate.

26. The optical device of claim 1 wherein the LED comprises a light conditioning optic.

27. The optical device of claim 1 wherein a switch is incorporated on the LED to permit switching between colors of light.

28. The optical device of claim 1 wherein the LED comprises a narrow-band emission in the range of about 20-25 nm FWHM.

29. The optical device of claim 1 wherein the reticle or microdisplay is placed on a same side of the light guide plate as a hologram.

30. A method of designing and recording a holographic optical element having optical power comprising using an intermediate hologram and a ray-tracing technique with dampened least squares optimization, which minimizes merit function and optimizes image quality wherein the holographic optical element is recorded with lasers of three different colors.

31. The method of claim 30 wherein a flexible film is used as an index matching material.

32. The method of claim 31 wherein a flexible film comprises a static cling vinyl material.

33. The method of claim 30 further comprising the use of an absorption liner comprising a black polyester or orange dyed polyester material as a top liner.

34. The method of claim 30 wherein the intermediate hologram is recorded by the ray-tracing technique and a final hologram is recorded by a collimated wavefront and a wavefront generated by the intermediate hologram.

* * * * *